United States Patent
Sarin et al.

(10) Patent No.: US 12,267,032 B2
(45) Date of Patent: Apr. 1, 2025

(54) DUAL INVERTER OPEN WINDING MACHINE FOR VEHICLE WITH ELECTRIC POWER TAKEOFF

(71) Applicant: GM GLOBAL TECHNOLOGY OPERATIONS LLC, Detroit, MI (US)

(72) Inventors: Akshay Sarin, Auburn Hills, MI (US); Alan B. Martin, Washington, MI (US); Brian Podczervinski, West Bloomfield, MI (US); Brian A. Welchko, Oakland Township, MI (US); Suresh Gopalakrishnan, Troy, MI (US); Mark J. Moran, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 127 days.

(21) Appl. No.: 18/366,176

(22) Filed: Aug. 7, 2023

(65) Prior Publication Data

US 2025/0055398 A1 Feb. 13, 2025

(51) Int. Cl.
*H02P 27/08* (2006.01)
*B60L 50/75* (2019.01)
*B60L 53/20* (2019.01)
*H01M 16/00* (2006.01)
*H02P 27/06* (2006.01)

(52) U.S. Cl.
CPC .............. *H02P 27/06* (2013.01); *B60L 50/75* (2019.02); *B60L 53/20* (2019.02); *H01M 16/006* (2013.01); *B60L 2210/40* (2013.01); *H01M 2220/20* (2013.01); *H01M 2250/20* (2013.01)

(58) Field of Classification Search
CPC . H02P 27/06; H01M 16/006; H01M 2220/20; H01M 2250/20
See application file for complete search history.

(56) References Cited

U.S. PATENT DOCUMENTS

| 7,199,535 B2 | 4/2007 | Welchko |
| 2006/0164027 A1* | 7/2006 | Welchko ................. H02P 27/06 318/105 |

OTHER PUBLICATIONS

Welchko; A Double-Ended Inverter System for the Combined Propulsion and Energy Management Functions in Hybrid Vehicles with Energy Storage; IEEE Industrial Electronics Society, IECON 05; Nov. 6-10, 2005, pp. 1-6.

* cited by examiner

*Primary Examiner* — Muhammad S Islam
(74) *Attorney, Agent, or Firm* — Quinn IP Law

(57) ABSTRACT

A dual inverter open winding machine for a vehicle. The machine may include an electric motor, a first energy source, a first inverter, a second energy source, and a second inverter. The first inverter may include a plurality of first switches independently operable between an opened position and a closed position to selectively connect and disconnect a first direct current (DC) port and a first alternating current (AC) port with one or more of the first energy source, the first inverter, and the motor. The second inverter may include a plurality of second switches independently operable between an opened position and a closed position to selectively connect and disconnect a second DC port and a second AC port with one or more of the second energy source, the second inverter, and the motor.

20 Claims, 3 Drawing Sheets

DUAL INVERTER OPEN WINDING MACHINE FOR VEHICLE WITH ELECTRIC POWER TAKEOFF

INTRODUCTION

The present disclosure relates to electric machines of the type having capabilities for distributing electrical power, such as but not necessarily limited to dual inverter open winding machines operable for managing electrical power distribution within a vehicle.

Vehicles may be manufactured with electric motors, devices, and a wide range of other systems capable of converting electrical power to mechanical power and/or vice versa. An electric motor, for example, may be included within a vehicle to provide mechanical power operable for propelling the vehicle or performing other work requiring mechanical power. Such vehicles may include a variety of electrical energy sources capable of supplying and/or storing electrical power for the motor, which may in turn require the vehicle to include related electronic componentry, circuits, etc. to facilitate transferring the attendant electrical power between devices, endpoints, networks, etc., both onboard and offboard the vehicle. The amount of hardware included within a vehicle to support electrically dependent operations may result in some overlap or duplication, e.g., different electrical systems onboard the vehicle may include similar or identical electronic componentry, circuits, etc. such that the resulting redundancy may generate waste, underutilize electrical componentry, and/or otherwise lead to inefficiencies.

SUMMARY

One non-limiting aspect of the present disclosure relates to an electric machine capable of facilitating a wide variety of electrically dependent operations for a vehicle in a manner that may limit redundancy, waste, underutilization, and other inefficiencies of electrically related hardware used in the support thereof. The electric machine, for example, may be configured as a dual inverter open winding machine having an electric motor configured for providing mechanical power to propel the vehicle and for supporting electrical power transfer onboard and offboard the vehicle. The use of the electric motor to facilitate electric power transfer within the vehicle may be advantageous in leveraging the use of the electric motor to facilitate reducing or limiting the amount of electrical hardboard hardware, componentry, circuits, etc. needed to support the wide variety of electrically dependent operations of the vehicle.

One non-limiting aspect of the present disclosure relates to a dual inverter open winding machine for a vehicle. The machine may include an electric motor operable according to a mechanical distribution mode and an electrical distribution mode, optionally with the mechanical distribution mode utilizing the motor to propel the vehicle, the electrical distribution mode utilizing the motor to support electrical power transfer for the vehicle. The electric motor may include a plurality of windings with each winding having a first end and a second end. The machine may further include a fuel cell energy source, a fuel cell inverter coupled between the fuel cell energy source and the first ends of the windings, and a plurality of fuel cell switches independently operable between an opened position and a closed position to selectively connect and disconnect a direct current (DC) battery port and an alternating current (AC) fuel cell port with one or more of the fuel cell energy source, the fuel cell inverter, and the first ends of the windings. The machine may further include a battery energy source, a battery inverter coupled between the battery energy source and the second ends of the windings, and a plurality of battery switches independently operable between an opened position and a closed position to selectively connect and disconnect a DC fuel cell port and an AC battery port with one or more of the battery energy source, the battery inverter, and the second ends of the windings. The machine may further include a controller configured for controlling the fuel cell switches, the battery switches, the fuel cell inverter, and the battery inverter according to a mechanical power distribution strategy when the electric motor is operating in the mechanical distribution mode and according to an electrical power distribution strategy when the electric motor is operating according to the electrical distribution mode.

The electrical power distribution strategy may be operable for implementing a DC battery charging mode for charging the battery energy source via the DC battery port, a DC battery power take off (PTO) mode for discharging the battery energy source via the DC battery port, an AC fuel cell PTO mode for discharging the fuel cell energy source via the AC fuel cell port, a DC fuel cell PTO mode for discharging the fuel cell energy source via the DC fuel cell port, an AC battery charging mode for charging the battery energy source via the AC battery port, and an AC battery PTO mode for discharging the battery energy source via the AC battery port.

The fuel cell switches may include a first fuel cell switch, a second fuel cell switch, a third fuel cell switch, a fourth fuel cell switch, and fifth fuel cell switch.

The battery switches may include a first battery switch, a second battery switch, a third battery switch, a fourth battery switch, and fifth battery switch.

The DC battery charging mode may include controlling the first and second battery switches and the third and fourth fuel cell switches to the closed position and controlling the third, fourth and fifth battery switches and the first, second, and fifth fuel cell switches to the opened position.

The DC battery PTO mode may include controlling the first and second battery switches and the third and fourth fuel cell switches to the closed position and controlling the third, fourth and fifth battery switches and the first, second, and fifth fuel cell switches to the opened position.

The DC fuel cell PTO mode may include controlling the third and fourth battery switches and first and second fuel cell switches to the closed position and controlling the first, second, and fifth battery switches and third, fourth, and fifth fuel cell switches to the opened position.

The AC fuel cell PTO mode may include controlling the fifth fuel cell switch to the closed position and controlling the first, second, third, fourth, and fifth battery switches and the first, second, third, and fourth fuel cell switches to the opened position.

The AC battery charging mode may include controlling the fifth battery switch to the closed position and controlling the first, second, third, and fourth battery switches and the first, second, third, fourth, and fifth fuel cell switches to the opened position.

The AC battery PTO mode may include controlling the fifth battery switch to the closed position and controlling the first, second, third, and fourth battery switches and the first, second, third, fourth, and fifth fuel cell switches to the opened position.

The fuel cell inverter may include a first fuel cell leg, a second fuel cell leg, a third fuel cell leg, and a fourth fuel cell leg connected in parallel, optionally with the first fuel cell leg including a first pair of fuel cell switches connected in series, the second leg including a second pair of fuel cell switches connected in series, the third leg including a third pair of fuel cell switches connected in series, and the fourth fuel cell leg including a pair of fuel cell capacitors connected in series.

The first end of a first one of the windings may connect between the first pair of fuel cell switches, the first end of a second one of the windings may connect between the second pair of fuel cell switches, and the first end of a third one of the windings may connect between the third pair of fuel cell switches.

The fifth fuel cell switch may include a primary switch connected between the first end of the first one of the windings and a first interface of the AC fuel cell port, a secondary switch connected between the first end of the second one of the windings and a second interface of the AC fuel cell port, a tertiary switch connected between the first end of the third one of the windings and a third interface of the AC fuel cell port, and a quaternary switch connected between the pair of fuel cell capacitors and a fourth interface of the AC fuel cell port.

The battery inverter may include a first battery leg, a second battery leg, a third battery leg, and a fourth battery leg connected in parallel, optionally with the first battery leg including a first pair of battery switches connected in series, the second leg including a second pair of battery switches connected in series, the third leg including a third pair of battery switches connected in series, and the fourth battery leg including a pair of battery capacitors connected in series.

The second end of the third one of the windings may connect between the first pair of battery switches, the second end of the second one of the windings may connect between the second pair of battery switches, and the second end of the first one of the windings may connect between the third pair of battery switches.

The fifth battery switch may include a primary switch connected between the second end of the first one of the windings and a first interface of the AC battery port, a secondary switch connected between the second end of the second one of the windings and a second interface of the AC battery port, a tertiary switch connected between the second end of the third one of the windings and a third interface of the AC battery port, and a quaternary switch connected between the pair of battery capacitors and a fourth interface of the AC battery port.

One non-limiting aspect of the present disclosure relates to a dual inverter open winding machine for a vehicle. The machine may include an electric motor operable according to a mechanical distribution mode and an electrical distribution mode. The electric motor may include a plurality of windings with each winding having a first end and a second end. The machine may further include a first energy source, a first inverter coupled between the first energy source and the first ends of the windings, and a plurality of first switches independently operable between an opened position and a closed position to selectively connect and disconnect a first direct current (DC) port and a first alternating current (AC) port with one or more of the first energy source, the first inverter, and the first ends of the windings. The machine may further include a second energy source, a second inverter coupled between the second energy source and the second ends of the windings, and a plurality of second switches independently operable between an opened position and a closed position to selectively connect and disconnect a second DC port and a second AC port with one or more of the second energy source, the second inverter, and the second ends of the windings.

The machine may further include a controller configured for controlling the first switches, the second switches, the first inverter, and the second inverter according to a mechanical power distribution strategy when the electric motor is operating in the mechanical distribution mode and according to an electrical power distribution strategy when the electric motor is operating in the electrical distribution mode, optionally with the mechanical distribution mode utilizing the motor to propel the vehicle and the electrical distribution mode utilizing the motor to support electrical power transfer for the vehicle without contemporaneously propelling the vehicle.

The controller may be configured for implementing the mechanical power distribution strategy and the electrical power distribution strategy based at least in part on controlling electrical power transfer through the windings.

One non-limiting aspect of the present disclosure relates to a multi-machine. The machine may include a plurality of dual inverter open winding machines connected in parallel and arranged in ring type configuration. The machine may further include at least one of a plurality of energy storage sources connected in parallel between each of the dual inverter open winding machines. The dual inverter open winding machines may each include an electric motor operable according to a mechanical distribution mode and an electrical distribution mode. The mechanical distribution mode may utilize the motor to provide mechanical power and the electrical distribution mode may utilize the motor to support electrical power transfer. The electric motor may include a plurality of windings with each winding having a first end and a second end. The dual inverter open winding machines may each include a first inverter coupled between one of the energy sources and the first ends of the windings, a second inverter coupled between another one of the energy source and the second ends of the windings, and a controller configured for controlling the dual inverter open winding machines according to a mechanical power distribution strategy when operating in the mechanical distribution mode and according to an electrical power distribution strategy when operating in the electrical distribution mode.

These features and advantages, along with other features and advantages of the present teachings, are readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
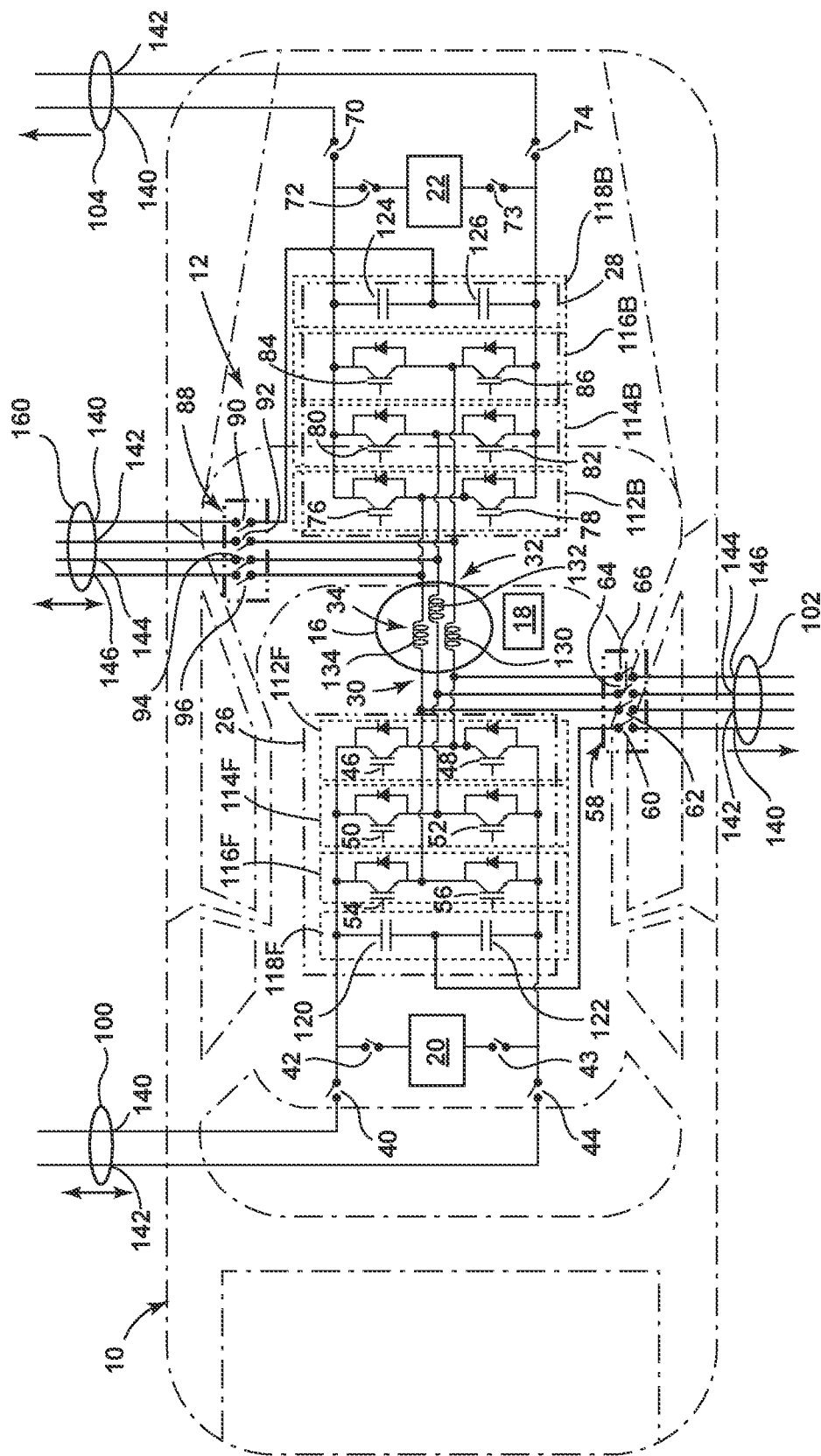
FIG. 1 illustrates a vehicle having an electric machine in accordance with one non-limiting aspect of the present disclosure.

FIG. 1 illustrates a vehicle 10 having an electric machine 12 in accordance with one non-limiting aspect of the present disclosure. The electric machine 12 may include electric motor 16 or other electrically driven device suitable for propelling or otherwise driving the vehicle 10. The electric motor 16 may be configured to convert electrical power to mechanical power of the type sufficient to provide rotational force or torque to one or more of a plurality of wheels (not labeled). A powertrain (not shown) may include a transmission, a driveshaft, a differential, axles, and/or other mechanical componentry configured for conveying rotative force from the motor 16 to the wheels. An internal combustion engine (ICE) (not shown) may optionally be included to additionally provide mechanical power to the wheels and/or to drive a generator or other device (not shown) operable for providing electrical power to the motor 16 or other systems onboard the vehicle 10. A controller 18 may be configured to generate control signals associated with directing and otherwise implementing desired control of the motor 16 and/or other features of the vehicle 10, such as those described below in more detail with respect to operating the electric machine 12. The vehicle 10 may be presented for non-limiting purposes as being representative of a wide variety of vehicles, devices, and the like that may rely upon converting electrical power to mechanical power for operation. Such vehicles may be generically referred to as electric vehicles and include a wide range of capabilities for supporting the conversion of electrical power to mechanical power.

The vehicle 10 may be configured to include differing configurations for generating, storing, and supplying electrical power to the electric motor 16 and/or other devices or system onboard the vehicle 10. One non-limiting aspect of the present disclosure relates to the electrical power being provided at least based in part on electrical power derived from a first energy source 20 and a second energy source 22 included as part of the electric machine 12, which are shown for exemplary purposes to respectfully correspond with a fuel cell system 20 and a rechargeable energy storage system (RESS) 22. The fuel cell system 20 may be configured to generate electrical power by relying at least partially upon hydrogen or other substances to support electrochemical reactions of the type suitable for generating electrical power. The RESS 22 may be comprised of or include one or more of a battery, a capacitor, or other construct capable of rechargeable storing and supplying electrical power provided thereto. The fuel cell system 20 may be illustrative of one type of energy source capable of generating electrical power while lacking a capability to effectively store electrical power provided thereto. The RESS 22 may be illustrative of one type of energy source incapable of generating but capable of both storing and supplying electrical power. This is done for non-limiting purposes as the present disclosure fully contemplates the first and second energy sources being one of a wide variety of energy sources capable of generating, supplying, and/or storing electrical power.

The electric machine 12 may include a pair of electrically isolated three-phase inverters 26, 28 connected respectively to a first end 30 and a second end 32 of a plurality of windings 34 included as part of the motor 16. The motor 16 may be configured in this manner as an open ended or open winding type of electric motor 16, i.e., one where the ends of the windings (inductors) may be connected to other circuitry as opposed to being connected or tied together. The first and second inverters 26, 28, which may be respectively referred to as a fuel cell inverter 26 and a RESS or battery inverter 28, may be each considered as a double-added inverter and/or a cascade inverter. Each inverter 26, 28 may include a plurality of switches 40, 42, 43, 44, 46, 48, 50, 52, 54, 56, 58, 60, 62, 64, 66, 70, 72, 73, 74, 76, 78, 80, 82, 84, 86, 88, 90, 92, 94, 96 independently operable between an opened position and a closed position to selectively connect and disconnect the inverters 26, 28 with one or more of a plurality of ports 100, 102, 104, 106 included onboard the vehicle 10, with the switches 40, 42, 43, 44, 46, 48, 50, 52, 54, 56, 58, 60, 62, 64, 66 associated with the fuel cell inverter 26 being characterized to as fuel cell switches and the switches 70, 72, 73, 74, 76, 78, 80, 82, 84, 86, 88, 90, 92, 94, 96 associated with the battery inverter 28 being characterized as battery switches. While the corresponding communication paths are not shown, the switches 40, 42, 43, 44, 46, 48, 50, 52, 54, 56, 58, 60, 62, 64, 66, 70, 72, 73, 74, 76, 78, 80, 82, 84, 86, 88, 90, 92, 94, 96 may be operable in response to a control signal provided from the controller 18 such that the controller 18 may provide a pulse width modulated (PWM) signal or other suitable for selectively and independently controlling the opening and closing of each of the switches 40, 42, 43, 44, 46, 48, 50, 52, 54, 56, 58, 60, 62, 64, 66, 70, 72, 73, 74, 76, 78, 80, 82, 84, 86, 88, 90, 92, 94, 96.

Each of the inverters 26, 28 may be characterized as including a first leg 110, a second leg 112, a third leg 114, and a fourth leg 116 connected in parallel, which may be referred to as fuel cell legs 112F, 114F, 116F, 118F when referenced to the fuel cell inverter 26 and battery legs 112B, 114B, 116B, 118B when referenced to the battery inverter 28. The first, second, and third legs 112F, 114F, 116F. 118F. 112B, 114B, 116B, 118B may include a plurality of switches 46, 48, 50, 52, 54, 76, 78, 80, 82, 84, 86 connected in series, such as in the illustrated manner where a pair of semiconductors, metal-oxide-semiconductor field-effect transistors (MOSFETs), or other suitable electronic device capable of selectively controlling the opening and closing thereof may be connected in series. The fourth legs 118F. 118B may include a plurality of capacitors 120, 122, 124, 126 or other componentry suitable for filtering, such as in the illustrated manner where a pair of capacitors 120, 122, 124, 126 may be connected in series. The first end of a first one 130 of the windings 34 may be connected between the pair of fuel cell switches 46, 48, the first end of a second one 132 of the windings 34 may be connected between the pair of fuel cell switches 50, 52, and the first end of a third one 134 of the windings 34 may be connected to the pair of fuel cell switches 54, 56. Similarly, the second end of the first one 130 of the windings 34 may be connected between the pair of battery switches 84, 86, the second end of the second one 132 of the windings 34 may be connected between the pair of battery switches 80, 82, and the second end of the third one 134 of the windings 34 may be connected between the pair of battery switches 76, 78.

One non-limiting aspect of the present disclosure contemplates the electric machine 12 being capable of facilitating a wide variety of electrically dependent operations in a manner that may optionally limit redundancy, waste, underutilization, and other inefficiencies of electrically related hardware used in the support thereof. The electric machine 12 may be operable for providing mechanical power via the motor 16 to propel the vehicle 10 and to additionally use the motor 16 for supporting electrical power transfer onboard and offboard the vehicle 10. The use of the electric motor 16 to facilitate electric power transfer may be advantageous in leveraging the use of the electric motor 16 to facilitate reducing or limiting the amount of electrical hardboard hardware, componentry, circuits, etc. needed to support electrically dependent operations. The electric machine 12 may be operable in accordance with the processes described herein to facilitate utilizing the electric motor 16 to distribute direct current (DC) and/or alternating current (AC) electrical power between the energy sources 26, 28 and systems onboard and offboard the vehicle 10, such as via the ports 100, 102, 104, 106.

To facilitate offboard distribution of electrical power, the ports 100, 102, 104, 106 may include with a first DC port, which may be referred to as a DC battery port 100, a first DC port, which may be referred to as an AC fuel cell port 102, a second DC port, which may be referred to as a DC fuel cell port 104, and a second AC port, which may be referred to as an AC battery port 106. Each of the ports 100, 102, 104, 106 may include a suitable interface for connecting with a network, an adapter, a connector, a charging device, or other mechanism or feature (not shown) suitable for exchanging electrical power. One non-limiting aspect of the present disclosure contemplates the controller 18 being configured for controlling the switches 40, 42, 43, 44, 46, 48, 50, 52, 54, 56, 58, 60, 62, 64, 66, 70, 72, 73, 74, 76, 78, 80, 82, 84, 86, 88, 90, 92, 94, 96 according to a mechanical power distribution strategy, electrical power distribution strategy, and/or additional strategies. The strategies may be used to control opening and closing of the switches 40, 42, 43, 44, 46, 48, 50, 52, 54, 56, 58, 60, 62, 64, 66, 70, 72, 73, 74, 76, 78, 80, 82, 84, 86, 88, 90, 92, 94, 96 to facilitate a desired distribution of electrical power relative to the energy sources. The mechanical power distribution strategy, for example, may include selectively opening and closing the switches 40, 42, 43, 44, 46, 48, 50, 52, 54, 56, 58, 60, 62, 64, 66, 70, 72, 73, 74, 76, 78, 80, 82, 84, 86, 88, 90, 92, 94, 96 to facilitate providing electrical power from the fuel cell system 20 and/or the battery 22 to the electric motor 16 for purposes of generating mechanical power or rotative force operable for propelling the vehicle 10. The electrical power distribution strategy, for example, may include selectively opening and closing the switches 40, 42, 43, 44, 46, 48, 50, 52, 54, 56, 58, 60, 62, 64, 66, 70, 72, 73, 74, 76, 78, 80, 82, 84, 86, 88, 90, 92, 94, 96 to facilitate distributing electrical power via the motor 16 between the ports 100, 102, 104, 106 and the fuel cell system 20 and/or the battery 22.

The electrical power distribution strategy may be operable for implementing a wide variety of power distribution modes, processes, activities, etc. One non-limiting aspect of the present disclosure contemplates the electrical power distribution strategy being operable for instantiating a DC battery charging mode for charging the battery energy source 22 with DC power via the DC battery port 100, a DC battery power take off (PTO) mode for discharging DC power from the battery energy source 22 via the DC battery port 100, an AC fuel cell PTO mode for converting DC power from the fuel cell energy source 20 to AC power for discharging via the AC fuel cell port 102, a DC fuel cell PTO mode for discharging DC power from the fuel cell energy source 20 via the DC fuel cell port 104, an AC battery charging mode for converting AC power received via the AC battery port 106 to DC power suitable for charging the battery energy source, and an AC battery PTO mode for converting DC power from the battery energy source 22 to AC power for discharging via the AC battery port 106. Each of the modes may be at least partially dependent on a portion of the electrical power being distributed via the windings 34 such that use of the windings 34 may be leveraged to minimize the amount of hardware required to support such a wide variety of electrical power distribution modes.

The DC battery charging mode may include controlling first and second battery switches 72, 73 and third and fourth fuel cell switches 40, 44 to the closed position and controlling the third, fourth and fifth battery switches 70, 74, 88 and the first, second, and fifth fuel cell switches 42, 43, 58 to the opened position. The DC battery PTO mode may include controlling the first and second battery switches 72, 73 and the third and fourth fuel cell 40, 44 switches to the closed position and controlling the third, fourth and fifth battery switches 70, 74, 88 and the first, second, and fifth fuel cell 42, 43, 58 switches to the opened position. The DC fuel cell PTO mode may include controlling the third and fourth battery switches 70, 74 and first and second fuel cell switches 42, 43 to the closed position and controlling the first, second, and fifth battery 72, 73, 88 switches and third, fourth, and fifth fuel cell 40, 44, 58 switches to the opened position. The AC fuel cell PTO mode may include controlling the fifth fuel cell switch 58 to the closed position and controlling the first, second, third, fourth, and fifth battery switches 72, 73, 70, 74, 88 and the first, second, third, and fourth fuel cell switches 42, 43, 40, 44 to the opened position. The AC battery charging mode may include controlling the fifth battery switch 88 to the closed position and controlling the first, second, third, and fourth battery switches 72, 73, 70, 74 and the first, second, third, fourth, and fifth fuel cell switches 42, 43, 40, 44, 58 to the opened position. The AC battery PTO mode may include controlling the fifth battery switch 88 to the closed position and controlling the first, second, third, and fourth battery switches 72, 73, 70, 74 and the first, second, third, fourth, and fifth fuel cell switches 42, 43, 40, 44, 58 to the opened position.

The capability of the electric machine 12 to operate according to the various electrical power distribution modes may be advantageous in enabling the present disclosure to facilitate the distribution of DC and/or AC electrical power. The ports 100, 102, 104, 106 may be correspondingly configured to facilitate exchanging DC and/or AC electrical power. The DC ports, i.e., the DC battery port 100 and the DC fuel cell port 104, for example, may include a positive terminal interface 140 and a negative terminal interface 142. The AC ports, i.e., the AC fuel cell port 102 and the AC battery port 106, for example, may include first, second, third, and fourth interfaces 146, 148, 150, 152 to support the three-phase Y AC offtake and single-phase L-N AC offtake. To facilitate the corresponding control, the fifth fuel cell switch 58 may include the switches 60, 62, 64, 66 and the fifth battery switch 88 may include the switches 90, 92, 94, 96 to selectively control opening and closing connections with the first, second, third, and fourth interfaces 146, 148, 150, 152 of the corresponding port 102, 106. The fifth fuel cell switch 58 may include a primary switch 66 connected between the first end of the first one 130 of the windings 34 and the interface 146 of the AC fuel cell port 102, a secondary switch 64 connected between the first end of the second one 132 of the windings 34 and the interface 144 of the AC fuel cell port 102, a tertiary switch 62 connected between the first end of the third one 134 of the windings 34 and the interface 142 of the AC fuel cell port 102, and a quaternary switch 60 connected between the pair of fuel cell capacitors 120, 122 and the interface 140 of the AC fuel cell port 102. Likewise, the fifth battery switch 88 may include a primary switch 92 connected between the second end of the first one 130 of the windings 34 and the interface 142 of the AC battery port 106, a secondary switch 94 connected between the second end of the second one 132 of the windings 34 and the interface 144 of the AC battery port 106, a tertiary switch 146 connected between the second end of the third one 134 of the windings 34 and the interface 146 of the AC battery port 106, and a quaternary switch 90 connected between the pair of battery capacitors 124, 126 and the interface 140 of the AC battery port 106.

Figure 2:
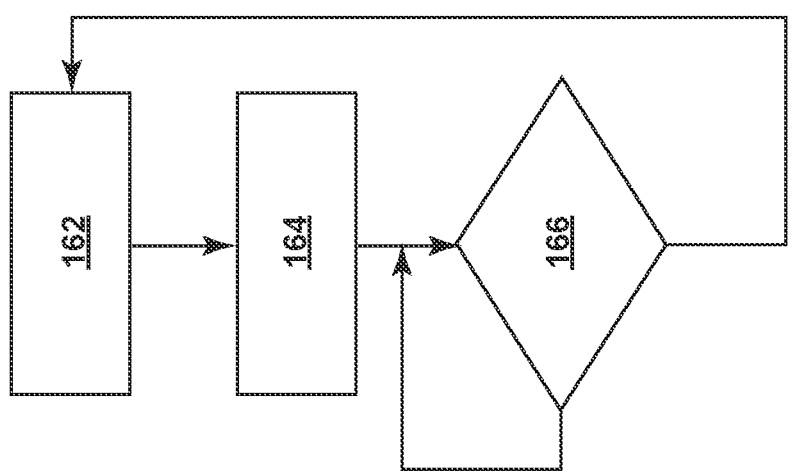
FIG. 2 illustrates a flowchart for a method of distributing electrical and mechanical power with the dual inverter open winding machine.

FIG. 2 illustrates a flowchart 160 for a method of distributing electrical and mechanical power with the dual inverter open winding machine 12. Block 162 relates to a mode selection process for selecting a mode for distributing electrical and/or mechanical power, such as according to one of the above-described modes. The controller 18 may be configured to determine the control mode based upon driver inputs and/or other commands provided thereto. Block 164 relates to a control process for monitoring implementation of the selected mode. The control process may be directed with the controller 18 generating suitable signals for selectively opening and closing the switches 40, 42, 43, 44, 46, 48, 50, 52, 54, 56, 58, 60, 62, 64, 66, 70, 72, 73, 74, 76, 78, 80, 82, 84, 86, 88, 90, 92, 94, 96 according to the mode to be implemented. Block 166 may relate to a monitoring or mode change process for assessing whether a need exists to switch from one mode to another mode. While the method is described with respect to controlling and adapting the electrical and/or mechanical power distribution for the electric machine 12 when included as part of the vehicle 10, the present disclosure fully contemplates the electric machine 12 being similarly beneficial and operable in other environments and with other devices besides the illustrated vehicle 10.

Figure 3:
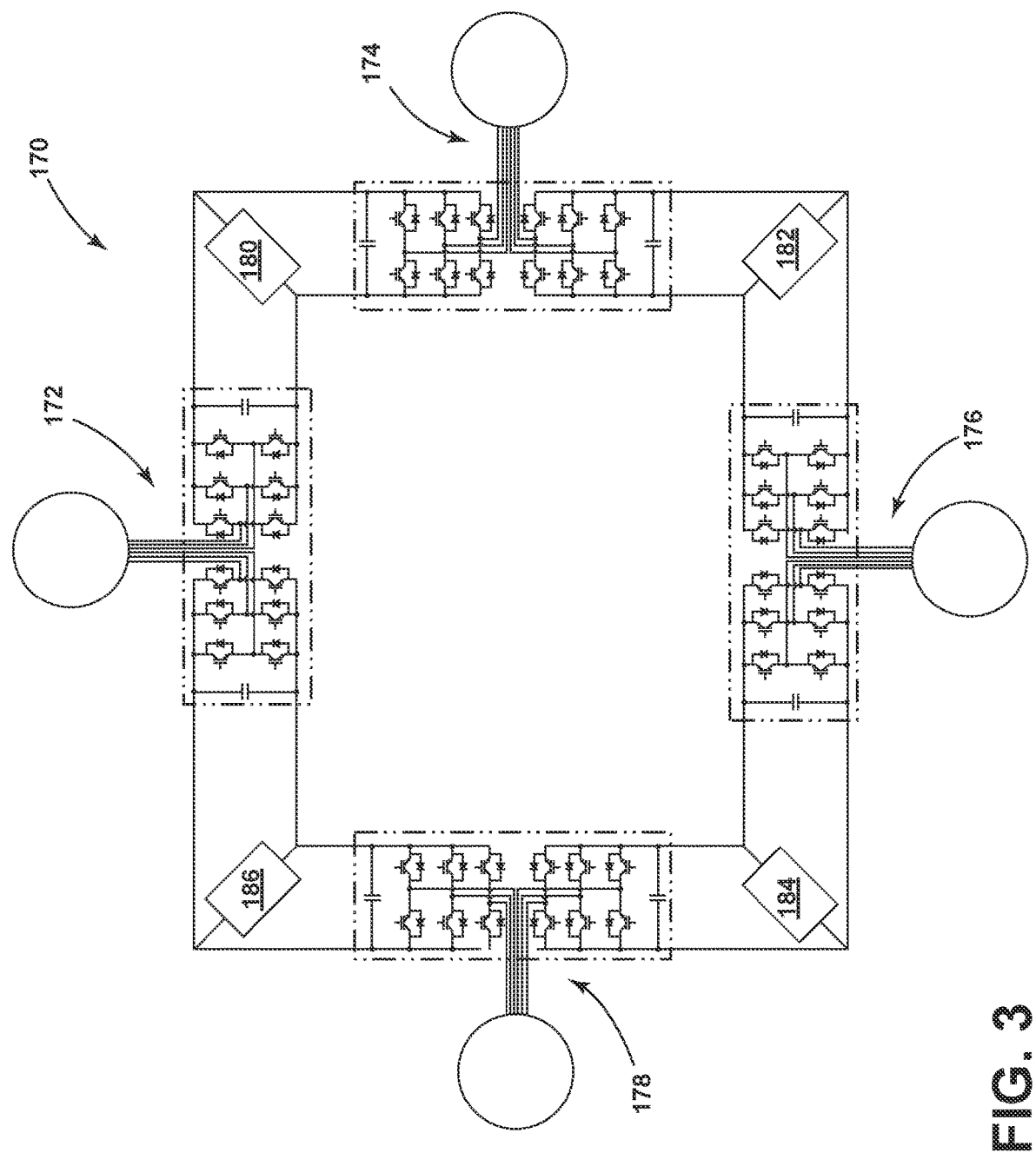
FIG. 3 illustrates a multi-machine in accordance with one non-limiting aspect of the present disclosure.

FIG. 3 illustrates a multi-machine 170 in accordance with one non-limiting aspect of the present disclosure. The multi-machine 170 may include a plurality of dual inverter open winding machines 172, 174, 176, 178, such as those described above, connected in parallel and arranged in ring type configuration. Rather than each machine 172, 174, 176, 178 including two energy sources, a plurality of energy storage sources 180, 182, 184, 186 connected in parallel to be shared between adjoining machines 172, 174, 176, 178, which are shown for non-limiting purposes to correspond with two fuel cell systems 182, 186 and to RESSs 180, 184. Each of the machines 172, 174, 176, 178 may include an electric motor and switches similar to that described above that may be operable according to a mechanical distribution mode, an electrical distribution mode, and/or a combined mode. The mechanical distribution mode may provide mechanical power through the motors. The electrical distribution mode may support electrical power transfer through the electric motors without contemporaneously providing the mechanical power. The combined mode may support electrical power transfer through the electric motors while also contemporaneously providing the mechanical power therethrough. A controller may be included for controlling the switches and other features of the dual inverter open winding machines 172, 174, 176, 178 to facilitate the desired mode of electrical and/or mechanical power distribution. The multimachine 170 may be beneficial with locomotives, vehicles, devices, equipment, etc. whereby multiple electric motors and/or energy sources may be available for supporting electrical and mechanical work.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All values of parameters (e.g., of quantities or conditions), unless otherwise indicated expressly or clearly in view of the context, including the appended claims, are to be understood as being modified in all instances by the term "about" whether or not "about" actually appears before the value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A dual inverter open winding machine for a vehicle, comprising:
  an electric motor operable according to a mechanical distribution mode and an electrical distribution mode, the mechanical distribution mode utilizing the motor to propel the vehicle, the electrical distribution mode utilizing the motor to support electrical power transfer for the vehicle, the electric motor including a plurality of windings with each winding having a first end and a second end;
a fuel cell energy source;
a fuel cell inverter coupled between the fuel cell energy source and the first ends of the windings;
a plurality of fuel cell switches independently operable between an opened position and a closed position to selectively connect and disconnect a direct current (DC) battery port and an alternating current (AC) fuel cell port with one or more of the fuel cell energy source, the fuel cell inverter, and the first ends of the windings;
a battery energy source;
a battery inverter coupled between the battery energy source and the second ends of the windings;
a plurality of battery switches independently operable between an opened position and a closed position to selectively connect and disconnect a DC fuel cell port and an AC battery port with one or more of the battery energy source, the battery inverter, and the second ends of the windings; and
a controller configured for controlling the fuel cell switches, the battery switches, the fuel cell inverter, and the battery inverter according to a mechanical power distribution strategy when the electric motor is operating in the mechanical distribution mode and according to an electrical power distribution strategy when the electric motor is operating according to the electrical distribution mode.

2. The dual inverter open winding machine according to claim 1, wherein:
the electrical power distribution strategy is operable for implementing:
a DC battery charging mode for charging the battery energy source via the DC battery port;
a DC battery power take off (PTO) mode for discharging the battery energy source via the DC battery port;
an AC fuel cell PTO mode for discharging the fuel cell energy source via the AC fuel cell port;
a DC fuel cell PTO mode for discharging the fuel cell energy source via the DC fuel cell port;
an AC battery charging mode for charging the battery energy source via the AC battery port; and
an AC battery PTO mode for discharging the battery energy source via the AC battery port.

3. The dual inverter open winding machine according to claim 2, wherein:
the fuel cell switches include a first fuel cell switch, a second fuel cell switch, a third fuel cell switch, a fourth fuel cell switch, and fifth fuel cell switch.

4. The dual inverter open winding machine according to claim 3, wherein:
the battery switches include a first battery switch, a second battery switch, a third battery switch, a fourth battery switch, and fifth battery switch.

5. The dual inverter open winding machine according to claim 4, wherein:
the DC battery charging mode includes:
controlling the first and second battery switches and the third and fourth fuel cell switches to the closed position; and
controlling the third, fourth and fifth battery switches and the first, second, and fifth fuel cell switches to the opened position.

6. The dual inverter open winding machine according to claim 4, wherein:
the DC battery PTO mode includes:
controlling the first and second battery switches and the third and fourth fuel cell switches to the closed position; and
controlling the third, fourth and fifth battery switches and the first, second, and fifth fuel cell switches to the opened position.

7. The dual inverter open winding machine according to claim 4, wherein:
the DC fuel cell PTO mode includes:
controlling the third and fourth battery switches and first and second fuel cell switches to the closed position; and
controlling the first, second, and fifth battery switches and third, fourth, and fifth fuel cell switches to the opened position.

8. The dual inverter open winding machine according to claim 4, wherein:
the AC fuel cell PTO mode includes:
controlling the fifth fuel cell switch to the closed position; and
controlling the first, second, third, fourth, and fifth battery switches and the first, second, third, and fourth fuel cell switches to the opened position.

9. The dual inverter open winding machine according to claim 4, wherein:
the AC battery charging mode includes:
controlling the fifth battery switch to the closed position; and
controlling the first, second, third, and fourth battery switches and the first, second, third, fourth, and fifth fuel cell switches to the opened position.

10. The dual inverter open winding machine according to claim 4, wherein:
the AC battery PTO mode includes:
controlling the fifth battery switch to the closed position; and
controlling the first, second, third, and fourth battery switches and the first, second, third, fourth, and fifth fuel cell switches to the opened position.

11. The dual inverter open winding machine according to claim 4, wherein:
the fuel cell inverter includes a first fuel cell leg, a second fuel cell leg, a third fuel cell leg, and a fourth fuel cell leg connected in parallel, with the first fuel cell leg including a first pair of fuel cell switches connected in series, the second leg including a second pair of fuel cell switches connected in series, the third leg including a third pair of fuel cell switches connected in series, and the fourth fuel cell leg including a pair of fuel cell capacitors connected in series.

12. The dual inverter open winding machine according to claim 11, wherein:
the first end of a first one of the windings connects between the first pair of fuel cell switches;
the first end of a second one of the windings connects between the second pair of fuel cell switches; and
the first end of a third one of the windings connects between the third pair of fuel cell switches.

13. The dual inverter open winding machine according to claim 12, wherein:
the fifth fuel cell switch includes:
a primary switch connected between the first end of the first one of the windings and a first interface of the AC fuel cell port;

a secondary switch connected between the first end of the second one of the windings and a second interface of the AC fuel cell port;
a tertiary switch connected between the first end of the third one of the windings and a third interface of the AC fuel cell port; and
a quaternary switch connected between the pair of fuel cell capacitors and a fourth interface of the AC fuel cell port.

14. The dual inverter open winding machine according to claim 11, wherein:
the battery inverter includes a first battery leg, a second battery leg, a third battery leg, and a fourth battery leg connected in parallel, with the first battery leg including a first pair of battery switches connected in series, the second leg including a second pair of battery switches connected in series, the third leg including a third pair of battery switches connected in series, and the fourth battery leg including a pair of battery capacitors connected in series.

15. The dual inverter open winding machine according to claim 14, wherein:
the second end of the third one of the windings connects between the first pair of battery switches;
the second end of the second one of the windings connects between the second pair of battery switches; and
the second end of the first one of the windings connects between the third pair of battery switches.

16. The dual inverter open winding machine according to claim 15, wherein:
the fifth battery switch includes:
a primary switch connected between the second end of the first one of the windings and a first interface of the AC battery port;
a secondary switch connected between the second end of the second one of the windings and a second interface of the AC battery port;
a tertiary switch connected between the second end of the third one of the windings and a third interface of the AC battery port; and
a quaternary switch connected between the pair of battery capacitors and a fourth interface of the AC battery port.

17. A dual inverter open winding machine for a vehicle, comprising:
an electric motor operable according to a mechanical distribution mode and an electrical distribution mode, the electric motor including a plurality of windings with each winding having a first end and a second end;
a first energy source;
a first inverter coupled between the first energy source and the first ends of the windings;
a plurality of first switches independently operable between an opened position and a closed position to selectively connect and disconnect a first direct current (DC) port and a first alternating current (AC) port with one or more of the first energy source, the first inverter, and the first ends of the windings;
a second energy source;
a second inverter coupled between the second energy source and the second ends of the windings; and
a plurality of second switches independently operable between an opened position and a closed position to selectively connect and disconnect a second DC port and a second AC port with one or more of the second energy source, the second inverter, and the second ends of the windings.

18. The dual inverter open winding machine according to claim 17, further comprising:
a controller configured for controlling the first switches, the second switches, the first inverter, and the second inverter according to a mechanical power distribution strategy when the electric motor is operating in the mechanical distribution mode and according to an electrical power distribution strategy when the electric motor is operating in the electrical distribution mode, the mechanical distribution mode utilizing the motor to propel the vehicle, the electrical distribution mode utilizing the motor to support electrical power transfer for the vehicle without contemporaneously propelling the vehicle.

19. The dual inverter open winding machine according to claim 18, wherein:
the controller may be configured for implementing the mechanical power distribution strategy and the electrical power distribution strategy based at least in part on controlling electrical power transfer through the windings.

20. A multi-machine, comprising:
a plurality of dual inverter open winding machines connected in parallel and arranged in ring type configuration;
at least one of a plurality of energy storage sources connected in parallel between each of the dual inverter open winding machines; and
wherein each of the dual inverter open winding machines includes:
an electric motor operable according to a mechanical distribution mode and an electrical distribution mode, the mechanical distribution mode utilizing the motor to provide mechanical power, the electrical distribution mode utilizing the motor to support electrical power transfer, the electric motor including a plurality of windings with each winding having a first end and a second end;
a first inverter coupled between one of the energy sources and the first ends of the windings;
a second inverter coupled between another one of the energy source and the second ends of the windings; and
a controller configured for controlling the dual inverter open winding machines according to a mechanical power distribution strategy when operating in the mechanical distribution mode and according to an electrical power distribution strategy when operating in the electrical distribution mode.

* * * * *